(No Model.)
J. H. BROWN.
MILLSTONE DRESS.
No. 393,534. Patented Nov. 27, 1888.
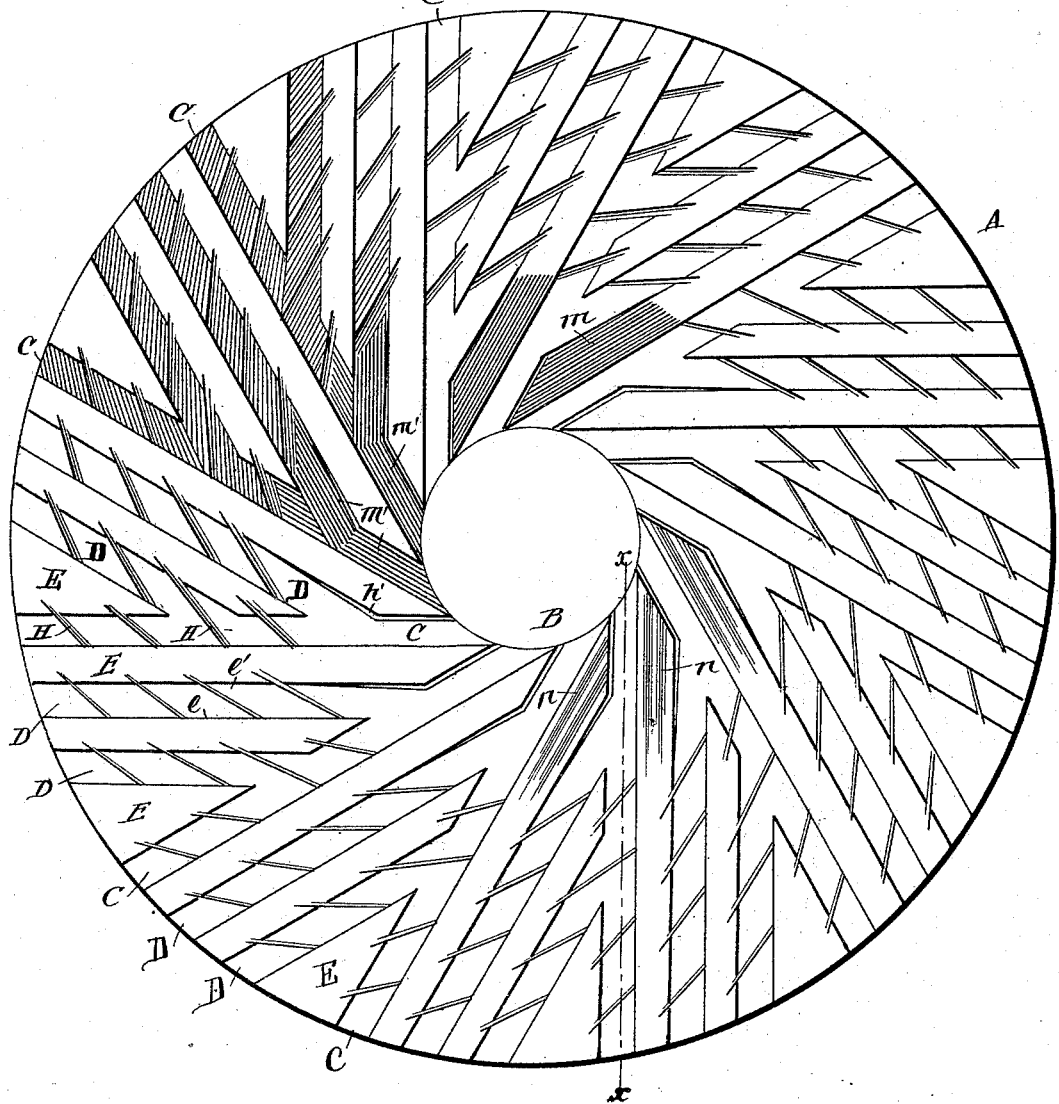
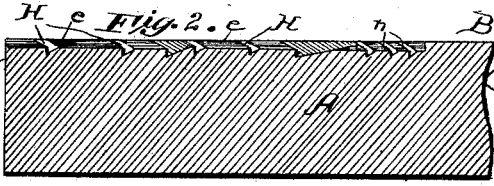
WITNESSES:
INVENTOR:
BY
ATTORNEYS.

UNITED STATES PATENT OFFICE.

JOSEPH H. BROWN, OF SOCIAL CIRCLE, GEORGIA, ASSIGNOR TO HIMSELF AND HEDGES L. SPENCER, OF SAME PLACE.

MILLSTONE-DRESS.

SPECIFICATION forming part of Letters Patent No. 393,534, dated November 27, 1888.

Application filed January 10, 1888. Serial No. 260,277. (No model.)

*To all whom it may concern:*

Be it known that I, JOSEPH H. BROWN, of Social Circle, in the county of Walton and State of Georgia, have invented a new and Improved Millstone-Dress, of which the following is a full, clear, and exact description.

My invention relates to an improved millstone dress for grinding wheat, corn, and other grain or products, and has for its object to provide a combination dress for use not only with wheat and corn, but also middlings and all varieties of grain, and also wherein the stone will grind rapidly, produce a superior quality of meal, and wherein, further, the stones will need but little dressing with the picks, may be run at a high rate of speed and keep cool, and need not necessarily be jammed down upon each other to grind fine meal or flour, as in the majority of stones.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in both the figures.

Figure 1 is a bottom plan view of the stone, and Fig. 2 is a section on line *x x*.

In illustrating the application of my improvement to a millstone I have shown it in connection with a popular form of dress, although it may be applied to any of the other well-known dresses.

Referring to the drawings, A represents a stone; B, the draft-circle or eye; C, the main furrow of each set of lands extending outward at a tangent from the draft-circle to the periphery of the stone. The decreasing tributary furrows completing each set are represented by the letter D and the respective lands by the letter E. The furrows C and D may have a plain dress, or the surface may be provided with a straw or other coarse dress, as found practical and desirable.

Each of the furrows C and D is provided with a series of short auxiliary furrows, H, at proper intervals apart, extending transversely of the same, commencing at the deepest points in said main and tributary furrows and carried obliquely or at an angle outward in the direction of the circumference, the angle being other than a right angle and suited to the size and grit of the stone and the work performed by the same.

The auxiliary furrows may be arranged upon straight or scroll lines, as desired, preferably the latter, and by their use, as can readily be seen by reference to Fig. 1, the main and tributary furrows are divided thereby into virtually a series of spaced lands, the faces of which are below the plane of the lands proper.

The object of the auxiliary transverse furrows H is to check or retard the progress of the partially-ground material and prevent it from passing too rapidly from the eye outward, and to so retain the material between the grinding-surfaces of the stone as that, when delivered therefrom by centrifugal force, the meal or flour will be in a thoroughly ground and even condition. The short transverse furrows H are cut deep down at the shoulder and the bottom of the furrows C and D, as shown at *e*, and grow more shallow as they pass up and out over the feathery edge *e'* of said furrows until they lose themselves, by a slight depression, in the near edge of the adjoining land E. It will be thus observed that by reason of the incision or depression in the land, together with the shape and position of the transverse auxiliary furrows, any excessive flow of the material to be ground will be effectively checked and will be compelled to pass along said auxiliary furrows up over the feathery edge and upon and over the lands. By this means an equal distribution of the work over the face of the stones is obtained and the greatest and heaviest portion of the grinding is caused to be performed adjacent to the eye or draft circle of the stone, where the least power is required to perform the work. By means of this dress also the grinding may be accomplished with the stones much farther apart than ordinary, whereby less friction is caused, and consequently less power is required, and a cool, even, and in every way better product obtained.

The horizontal furrows, which may be designated as "auxiliary angular," may be or may not be produced upon the same angle. Preferably, however, each one, as shown, is placed at a different angle. For instance, those furrows nearest the eye or draft-circle, where the surface speed of the stone is slowest, are placed at the greatest angle, the angle being decreased as the periphery of the stone is approached, the surface speed of the stone being greatest at the skirt.

It will be evident to any person skilled in the art that stones upon which this improvement is attached may be run with a greater draft and a deeper furrow than can be profitably used in connection with any other dress.

I desire it distinctly understood that I do not confine myself to any particular number of auxiliary angular furrows, nor to any particular locality at which they shall be placed on either top or bottom stone, the arrangement illustrated being preferred for stones having a diameter of about four feet and adapted for meal. For grinding wheat I prefer that the angular furrows be so cut upon the top and bottom stones that when their dressed faces are brought in contact the said furrows will alternate. While the angular furrows check too great a flow of grain, they do not block up the main or tributary furrows or stop the circulation of air along them.

In further carrying out the invention the inner end of the main furrow and the next shorter or tributary furrow is provided upon its feather-edge with a slight shoulder, $h'$, which extends outward as far as the first angular furrow, decreasing in depth after leaving the inner end of the furrow and terminating at nothing at the intersection with the first angular furrow. The advantage of this shouldered feathered edge is that it prevents an excessive flow of the grain from passing over the lands too close to the eye or draft-circle, which wears the center of the bed-stone and makes prematurely into meal much of the product which should only be crushed and reduced around the eye preparatory to being more finely ground as it passes away from that portion of the stone. These shouldered edges also serve the purpose of catching a large portion of the grain and pulverizing it to a greater or less extent preparatory to being caught up by the angular furrows and thrown over onto the lands, which, as the operation is repeated, keeps the crushed grain moving from land to land until it is reduced to the proper degree of fineness. This shouldered edge is preferably employed upon stones utilized for grinding corn.

In connection with the shouldered feather-edge I also produce upon the surface of the main furrow and the next shortest furrow a series of lines, $m$, known as "pick-marks," running parallel with the shoulder and terminating at the first or inner angular furrows; and I further provide upon the main and shorter or tributary furrow a series of pick-marks, $m'$, between the angular furrows parallel with the shoulder thereof. These pick-marks materially assist in carrying the material over upon the lands.

In completing my improved dress I produce upon that portion of the lands adjacent to the shouldered edge of the main furrow a series of one or more longitudinal shallow grooves, $n$, the number of grooves being regulated by the width of the land. These grooves are purposed to assist the central portion of the stones in breaking and reducing the grain preparatory to a further reduction.

Having thus fully described my invention, I claim as new and desire to secure by Letters Patent—

1. A millstone-dress provided with a series of main furrows, C, extending outward at a tangent to the eye of the stone, a series of decreasing tributary furrows, D, a series of lands, E, between the furrows and having feathery edges, and a series of auxiliary furrows, H, extending obliquely across the main and tributary furrows, the said furrows decreasing in depth from the bottom of the furrows to and slightly beyond the feathery edge of the adjacent land, substantially as herein shown and described.

2. A millstone provided with a series of main furrows, C, extending outward at a tangent to the eye to the periphery, a series of decreasing tributary furrows, D, and a series of auxiliary furrows, H, extending obliquely across the main and tributary furrows, the said main furrow and the first tributary furrow being provided with the shoulder $h'$, substantially as herein shown and described.

3. A millstone provided with a series of main furrows, C, provided with the pick-marks $m'$, a series of decreasing tributary furrows, D, and the auxiliary furrows H, extending obliquely across the main and tributary furrows, the said main and tributary furrows being provided with pick-marks $m'$ between the angular furrows and parallel with the shoulder thereof, substantially as herein shown and described.

4. A millstone provided with a series of main furrows, C, a series of decreasing tributary furrows, the auxiliary furrows H, extending obliquely across the main and tributary furrows, the shoulder $h'$, the pick-marks $m\,m'$, and the grooves $n$ in the lands adjacent to the shouldered edge of the main furrows, substantially as herein shown and described.

JOSEPH H. BROWN.

Witnesses:
E. T. MAYO,
A. M. COLTON.